H. V. LOUGH.
SEALING RING APPLYING MACHINE.
APPLICATION FILED JAN. 13, 1921.
1,431,405.
Patented Oct. 10, 1922.
5 SHEETS—SHEET 2.
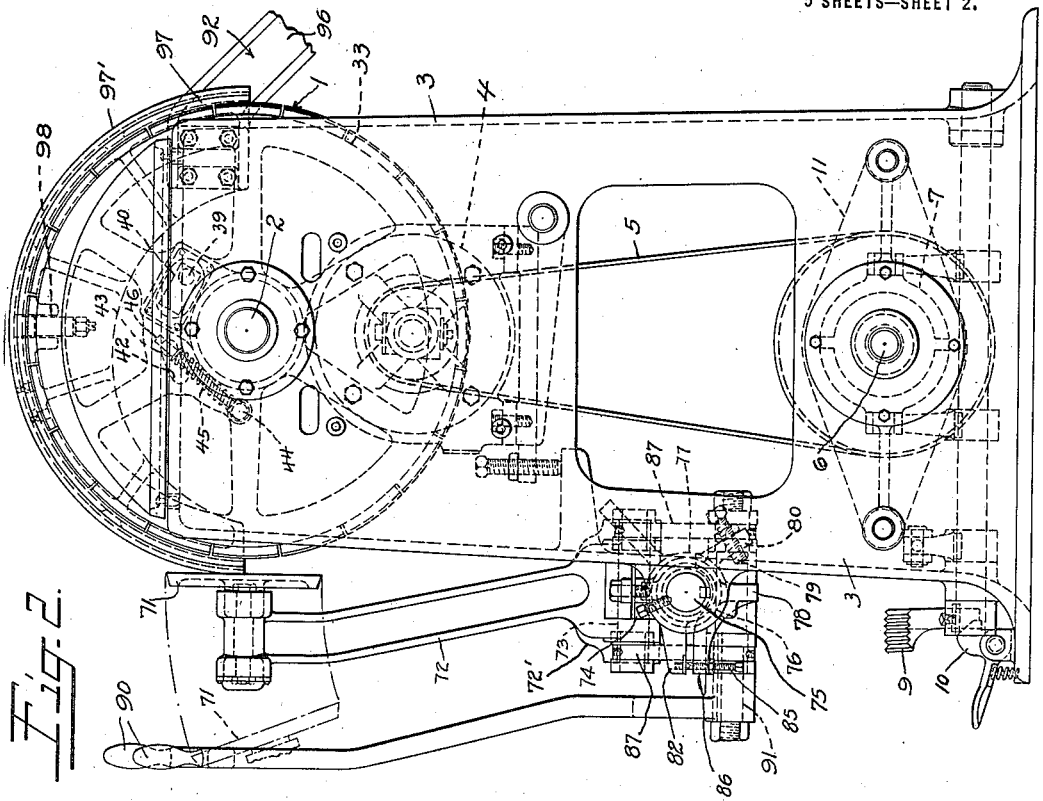
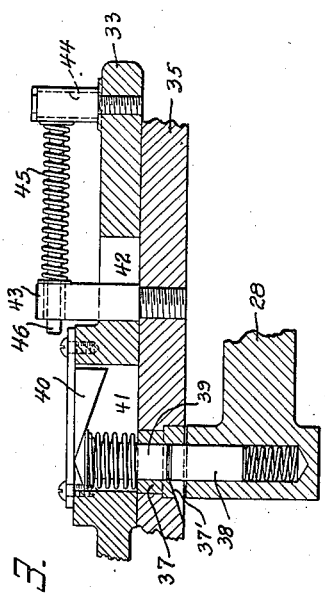
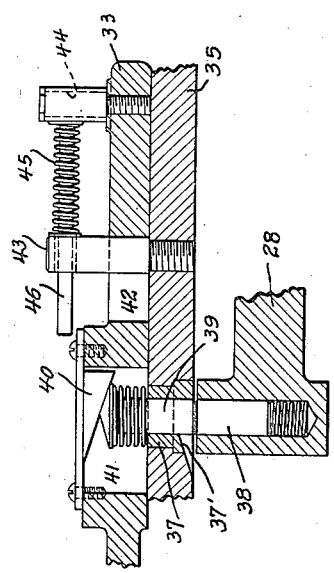
Inventor
Hector V. Lough
By his Attorney
Ernest Hopkinson

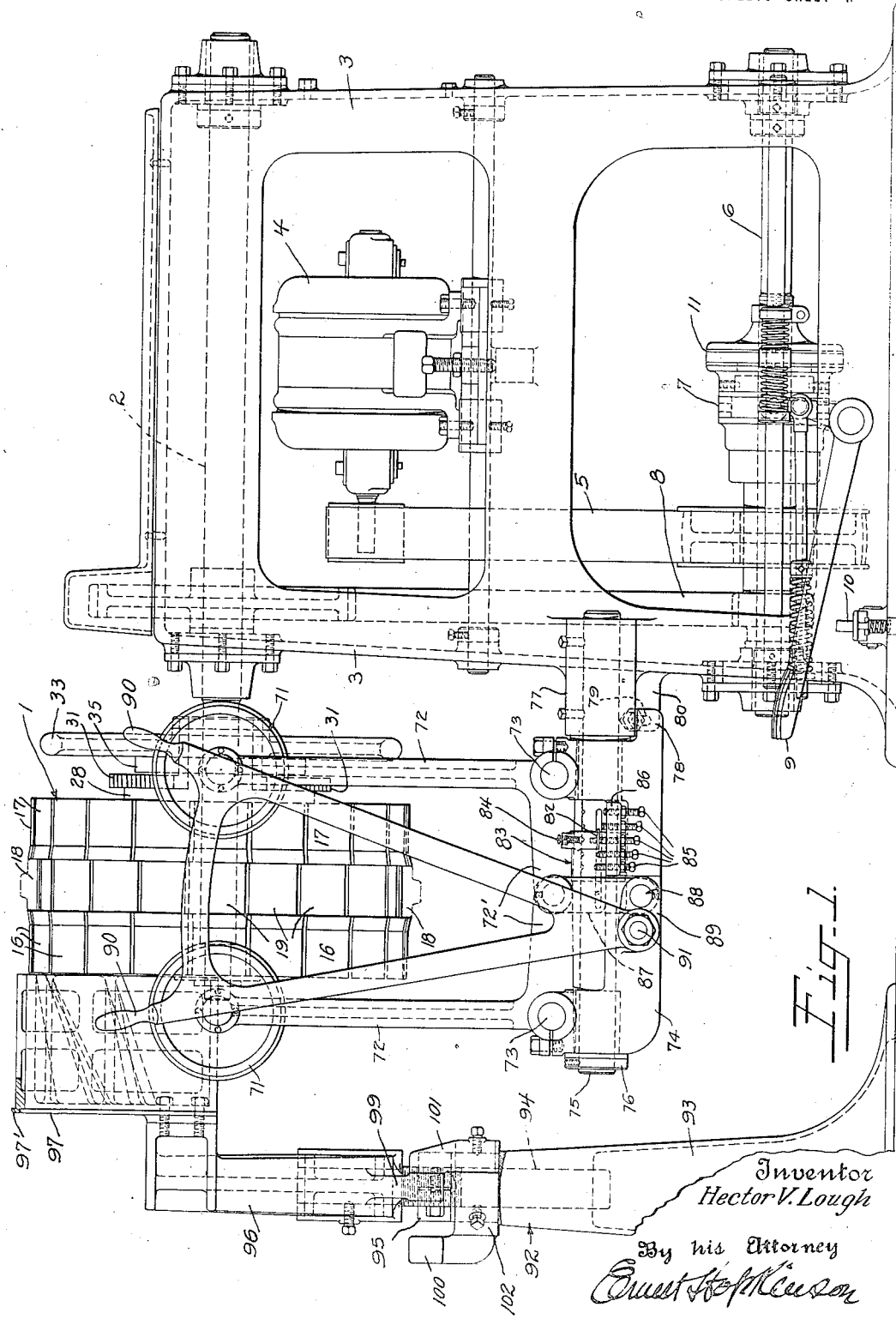

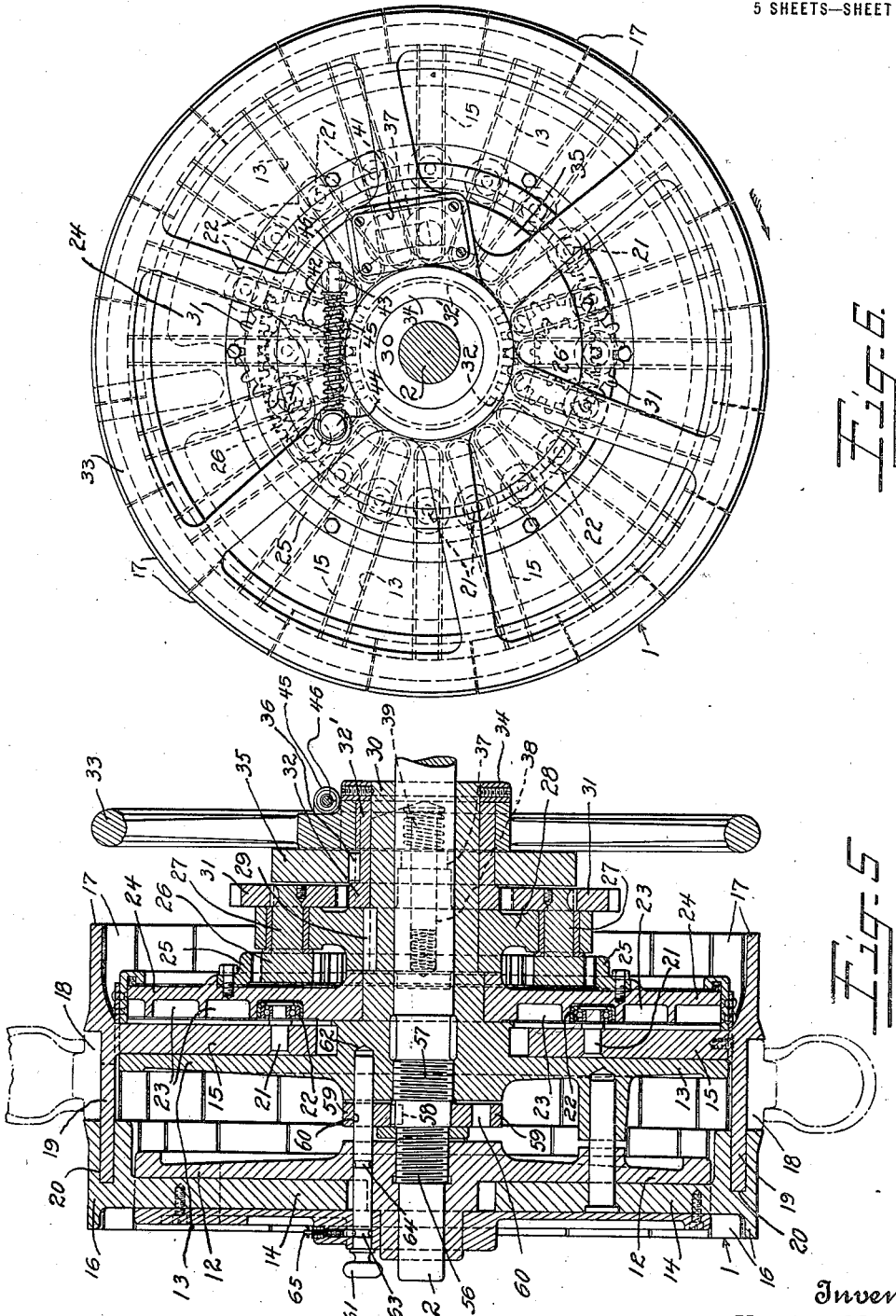

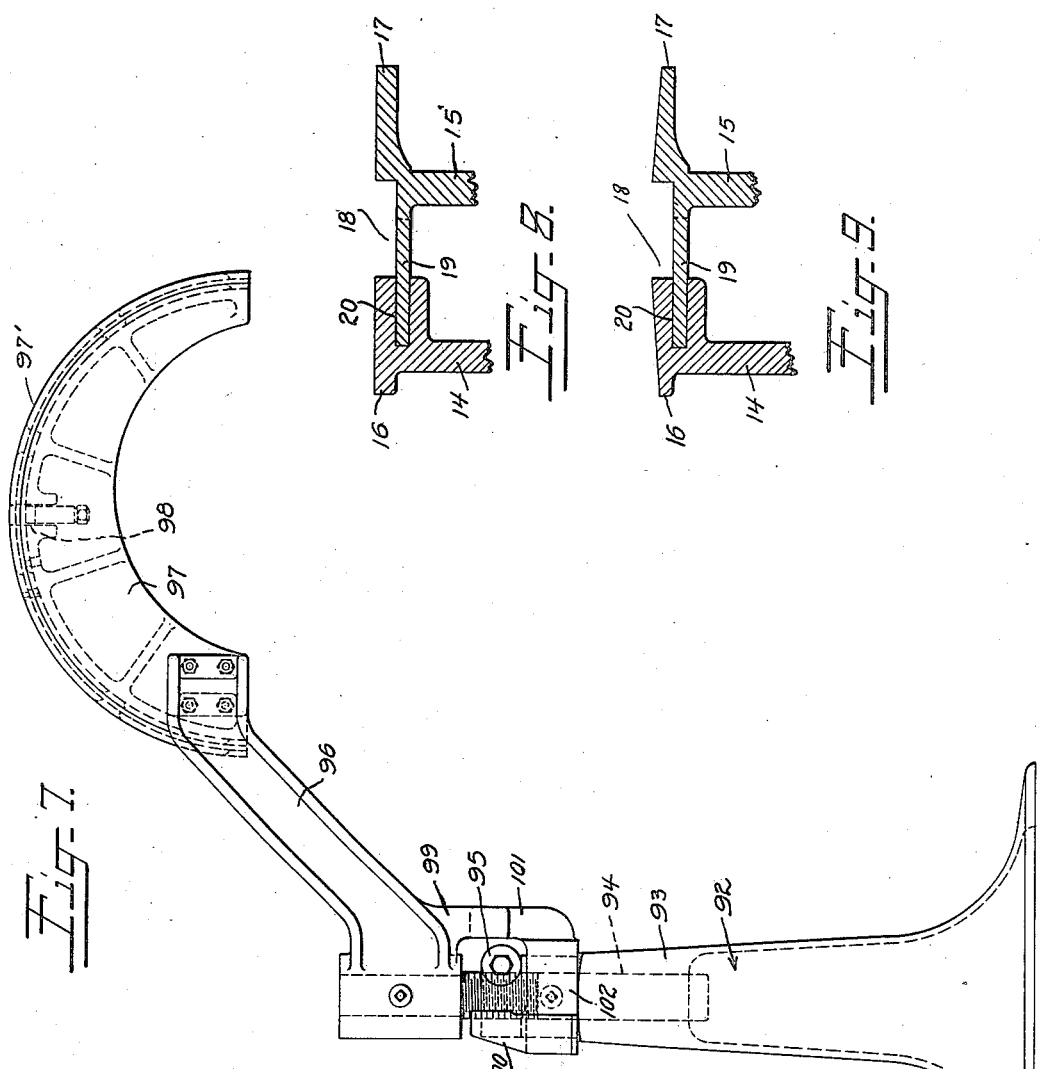

H. V. LOUGH.
SEALING RING APPLYING MACHINE.
APPLICATION FILED JAN. 13, 1921.
1,431,405.
Patented Oct. 10, 1922.
5 SHEETS—SHEET 5.
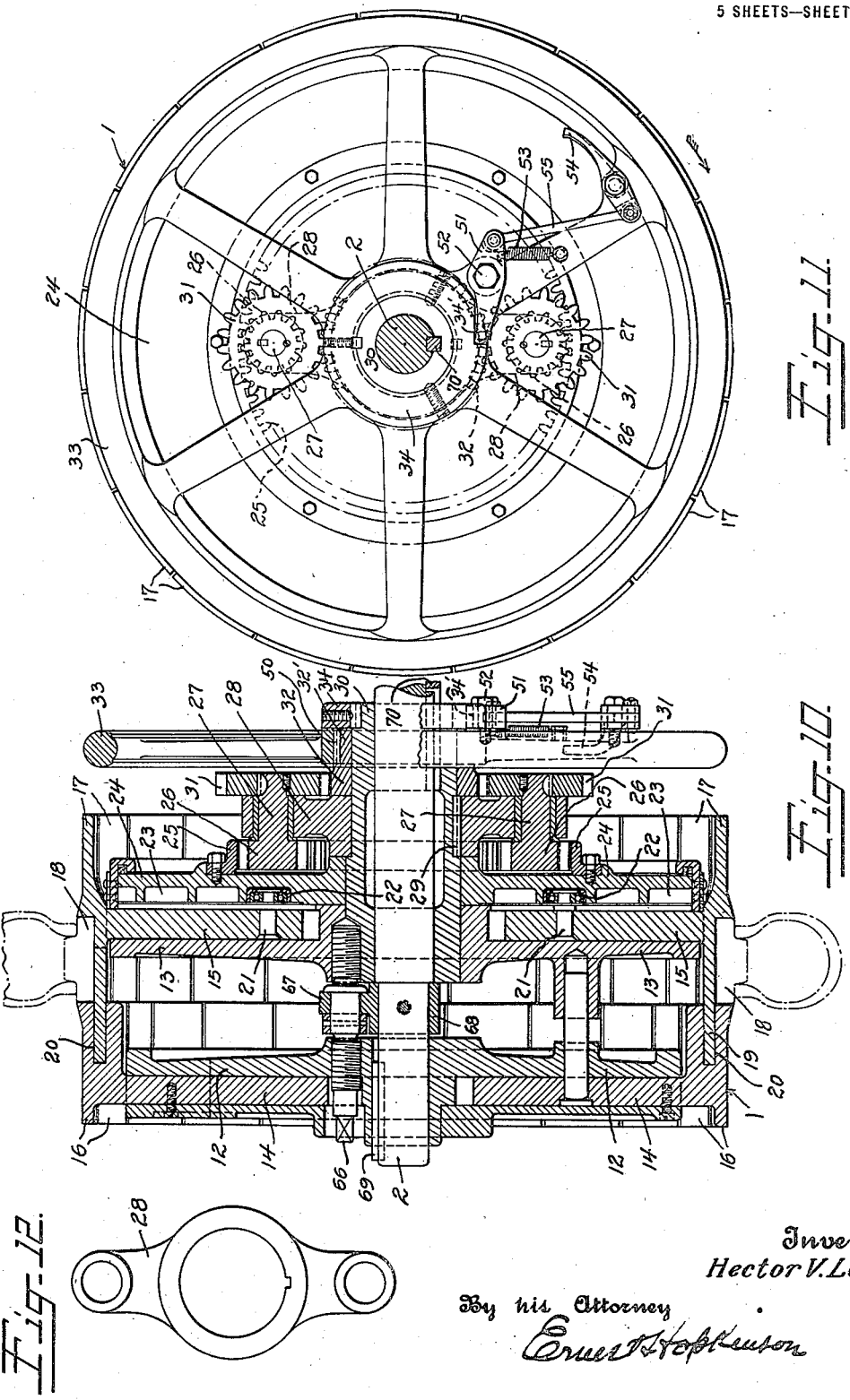
Inventor
Hector V. Lough
By his Attorney Patented Oct. 10, 1922.

1,431,405

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

SEALING-RING-APPLYING MACHINE.

Application filed January 13, 1921. Serial No. 436,890.

*To all whom it may concern:*

Be it known that I, HECTOR V. LOUGH, a subject of the King of Great Britain, residing at Hartford, county of Hartford, and State of Connecticut, have invented certain new and useful Improvements in Sealing-Ring-Applying Machines, of which the following is a full, clear, and exact description.

This invention relates to the manufacture of tires, and more particularly to apparatus for mounting a built-up carcass on a sealing ring preliminary to vulcanization.

In mounting a straight-sided or quick detachable type of carcass or tire on a sealing ring, it has been customary after spreading the beads for the reception of the sealing ring and flanking conical side rings, to drive the inextensible beads up the conical surface of the side rings onto the sealing ring by progressive hammering with wooden wedges, one bead being first mounted, the tire turned over, and then the other bead seated. A sealing strip of rubber composition is usually located between a shoulder on the sealing ring and the toe of the bead, this being desirable in one process of curing tires under internal fluid pressure without an air-bag. The above mentioned method is arduous, the workmen whack their hands daily, the operation is slow and time consuming, and sometimes even two men cannot succeed in getting the beads positioned on the sealing ring. Still further, and possibly more important, the bead portions of the tire are marred or injured, the harm done varying with the temper and skill of the workers. These objections have heretofore been tolerated for lack of a practical and commercial alternative.

The present invention aims to provide an apparatus for mounting tires on sealing rings quickly, easily, and without objectionable injury to the bead portions thereof.

With the embodiment of the invention illustrated in the drawings in mind, and without intention to limit the scope of the invention more than is required by the prior art, the apparatus comprises essentially a chuck having bead engaging surfaces which may be adjusted to distend the tire beads and from which the tire beads may be shifted onto a sealing ring positioned intermediate the bead supporting surfaces of the chuck, the shifting being accomplished by pressing devices in the form of rolls that may be advanced simultaneously against the beads at substantially opposite points while the chuck is rotated. A stand having a half-round saddle at the end of an arm swiveled thereto is located so that the tires may be loosely positioned about the sealing rings by one man, and swung into substantially flush relation with the chuck for convenience in initially positioning the ring and tire on the chuck which is operated by another man to mount the beads on the sealing ring.

Embodiments of the invention are illustrated in the accompanying drawings, in which—

Figure 1 is a front elevation of the chuck and its supporting stand located in cooperative relation with a preparatory assembling stand;

Fig. 2 is an end elevation as viewed from the right of Fig. 1;

Figs. 3 and 4 are developed circular cross-sections through the hand wheel showing details of a locking pin construction in locked and unlocked positions, respectively;

Fig. 5 is a cross section through one form of chuck;

Fig. 6 is a side elevation of the chuck shown in Fig. 5 from the rear side thereof, looking at the hand wheel;

Fig. 7 is an elevation of the preparatory assembling stand as it would appear when viewed from the left of Fig. 1;

Figs. 8 and 9 are sectional details of different forms of bead supporting surfaces with which the chuck sections may be provided;

Figs. 10 and 11 are sections and elevations respectively similar to Figs. 5 and 6 of a preferred form of chuck; and Fig. 12 is a detail of a spider or bracket on the chuck shown in Figs. 10 and 11.

In the drawings, Fig. 1, the chuck indicated generally by the numeral 1 is shown supported on the free end of a shaft 2 which is journaled in a frame 3 housing a motor 4. The motor is belted as indicated at 5 to a jack shaft 6 which may be provided with any suitable type of clutch 7 for transmission of power through the belt or chain 8 to the chuck spindle 2. By a treadle 9 and foot latch 10 operation of the clutch 7 may be controlled. Any suitable form of brake may be employed to rapidly halt rotation of a chuck such as is indicated generally in the drawings by the numeral 11. The parts above mentioned specifically form no part of the present invention, being merely illustrated for the purpose of showing one manner in which the shaft 2 may be rotated. Preferably the parts are arranged so that depression of the treadle will engage the clutch and disengage the brake, and vice versa.

The chuck shown in Figs. 5 and 6 consists of front and rear plates or discs 12 and 13 which are suitably cut away to receive the stems 14 and 15 of spaced series of chuck segments 16 and 17. The surfaces of the segments are arcuate in the direction of the periphery of the chuck, and they may be either cylindrical, as indicated in Fig. 8, more or less conical, as indicated in Fig. 9, or both cylindrical and conical, as indicated in Fig. 5, the latter construction being preferred. A channel 18 for receiving a sealing ring is formed intermediately of the spaced series of segments and the bottom wall of this channel is formed by arcuate flanges 19 extending from one series of the chuck segments into slots 20 provided in the other series of chuck segments. The bead engaging surfaces of the segments constituting the periphery of the chuck are preferably located contiguous the bead receiving surfaces of the sealing ring so that no appreciable crevice or crack occurs for the bead to drop into during the mounting operation.

The chuck segments are shiftable to vary its diameter and thereby distend the beads of a tire resting on the surfaces of their segments. For this purpose, the stems 15 of the rear segments are each provided with pins 21 carrying anti-friction rolls 22 which enter the spiral groove 23 of a scroll cam 24, the parts being so positioned that when assembled in cooperative relation the several surfaces of the segments are equi-distant from the axis of the spindle 2. Rearwardly of the scroll cam 24 is secured an internal gear 25 whose teeth are in mesh with diametrically disposed pinions 26 on shafts 27 mounted in a bracket or spider 28 which is keyed as indicated at 29 to the hub or rearwardly extending sleeve 30 of the rear chuck plate. Gears 31 on the pinion shaft in mesh with a gear 32 journaled on the hub 30 are adapted to be turned by the hand wheel 33 in either direction to shift the sections and vary the diameter of the chuck.

Two forms of connections are illustrated for rotating the gear 32 with the hand wheel. The form shown in Figs. 5 and 6 comprehends a locking pin and operating cam whose details of construction are illustrated best in Figs. 3 and 4. In this form of the mechanism for shifting the segments, the hand wheel 33 is loose on the lateral hub 32' of the gear 32 and is confined against axial movement between a collar 34 which is fixed to the hub 30 of the rear chuck plate and a disc 35 which is keyed at 36 to the hub 32' of the hand wheel gear. The disc 35, see Figs. 3 and 4, is provided with an apertured bushing 37 that is adapted to be entered by a spring pressed pin 38 socketed in the bracket or spider 28 which is keyed to the hub of the rear chuck plate. When this pin is in the position shown in Fig. 3, suddenly initiated rotation of the chuck will prevent the inertia of the hand wheel from moving the chuck segments inwardly. Thus the pin functions as a detent or lock.

But of course it is necessary to adjust the chuck segments both inwardly and outwardly, and means must be provided to render the pin ineffective. For this purpose a second spring operated pin 39 mounted in the bushing 37 is adapted to be operated by a wedge or cam 40 housed in the recess 41 of the hand wheel. The hand wheel is also slotted as indicated at 42 to pass the shouldered stud screw 43 and between this stud screw and a second stud screw 44 threaded into a part of the hand wheel is interposed a spring 45 that encircles a rod 46 swiveled to one and passing loosely through the other of the stud screws. The hand wheel may be turned in the direction of the arrow shown in Fig. 6 so as to move the hand-wheel-cam 40 and through the pin 39 eject the locking pin 38. The position of the parts when the locking or latching pin has been shifted is shown in Fig. 4. Obviously, continued pull on the hand wheel in the direction of the arrow, Fig. 6, will, through the train of gears previously mentioned, operate the scroll cam and contract the chuck segments. When the hand wheel is pulled upon in a direction opposite to that indicated by the arrow, Fig. 6, the locking pin or latch 38 does not hinder adjustment of the chuck segments, being ejected by the cam surface 37' formed on the bushing 37 and disc 35. In adjusting the chuck segments with this form of connection between the hand wheel and the gear train for operating the scroll cam, the locking pin or latch 38 may be utilized to gauge the different diameters of the chuck for handling different sizes of tires. This may be achieved through suitably proportioning the gear train and suitably shaping the scroll cam so that a single revolution of the hand wheel relative to the chuck plates will change the diameter of the chuck from one size to the next.

It is preferred, however, to operate the gear train 32—31—26—25 and the scroll cam 24 positively from the hand wheel 33 by the form of construction shown in Figs. 10 and 11. Referring to these figures, this preferred construction comprises a key 50 for fixing the hand wheel to the sleeve 32' of the gear 32 which is in mesh with the gear pinion set 31 and 26. The bracket or spider 28 as in the previously mentioned construction is keyed to the sleeve or hub 30 and the rear chuck plate. Thus the hand wheel 33 is positively and constantly geared to the scroll cam 24. To prevent the inertia of the hand wheel from rotating the scroll cam relative to the chuck plate, as when the chuck is initially started, the collar 34 is formed with a notch 34' to function as a ratchet wheel in cooperation with the pawl 51 which is fulcrumed at 52 to a spoke of the hand wheel, and normally held by a tension spring 53 in the locking position shown. Through a finger lever 54 and link 55 conveniently located on the hand wheel, the pawl 51 may be disengaged to permit rotation of the hand wheel in the direction it normally opposes. This form of hand wheel has no limited independent rotation relative to the gear 32 as in the previously described construction of Figs. 5 and 6.

The sealing rings for the different sizes of tires which this apparatus desirably handles, not only vary in diameter but also in width. While it would be possible to fashion the chuck segments so as to define a channel 18 large enough to receive the widest bull ring, it is preferable to centralize the sealing ring and to confine it against lateral movement, i. e., movement bodily sidewise in the direction of the axis of the shaft 2. Lateral adjustment may be effected in a variety of ways, and two species of construction are illustrated for that purpose.

One form is shown in Fig. 5. Contiguous portions of the hubs of the chuck plates 12 and 13 are oppositely threaded onto right and left hand threaded portions 56 and 57 of the spindle or shaft 2, intermediate which is keyed as indicated at 58 to the shaft 2 a locking disc 59 provided with a suitable number of apertures 60. Through any one of these apertures a locking pin 61, carried by the front chuck plate, may be passed into any one of a plurality of apertures 62 provided in the rear chuck plate. The locking pin is provided with spaced grooves 63—64 into which a spring pressed detent 65 is adapted to lodge to hold the pin either in the locked position shown or in an unlocked position clear of the disc 59. As the chuck plates intermediate the stems of their segments are pinned together as indicated at 60, it will therefore be seen that when the locking pin 61 is retracted out of the disc, the chuck plates carrying the segments may be rotated about the shaft 2 and separated or approached to widen or narrow the channel 18 for the accommodation of sealing rings of different widths.

The second and preferred form of channel-width-adjusting mechanism is illustrated in Figs. 10 and 11 and comprises a wrench operable right and left hand threaded member 66 which is rotatably mounted in the ear 67 of a collar 68 fast to the shaft 2. The chuck plates in this form of the construction are feathered as indicated at 69 and 70 to the shaft 2 and consequently when the right and left hand threaded member is turned, the chuck plates may be approached or separated.

Means are provided for shifting or pressing the beads of a carcass, after they have been expanded or distended to the proper size, onto the seats of a sealing ring that is held in the channel 18 in substantially flush and preferably exactly flush relation with the contiguous surfaces of the chuck segments. While this may be accomplished with any suitable tool, a presser in the form of a roller is preferred. And while, also, one roller may be used, it is preferred to use two to simultaneously shaft the beads of a tire onto the seats of the sealing ring and to provide mechanical means for operating the rollers.

The preferred form of bead pressing mechanism is illustrated best in Figs. 1 and 2 of the drawings, in which the opposed presser rolls 71 are each shown mounted on bell cranks 72 which are fulcrumed on studs 73 carried by a casting or rocker 74 that is free to swing in a vertical plane within certain limits on an outhung shaft 75 between the collar 76 at one end and a supporting boss 77 integral with the frame at the other end of the shaft.

The casting or rocker 74 is provided with a lug or ear 78 adjacent the chuck stand frame 3 which is adapted to contact with the end of a stud screw 79 mounted in a fixed part 80 of the frame to limit outward movement of the discs away from the chuck. The movement of the pressers or rolls towards the chuck is limited by a second stop 82 that is integral with a sleeve 83 feathered to the shaft 75 and adapted to be held in different positions by a spring pressed detent 84. The sleeve 83 may be shifted in the direction of the axis of the shaft to position it in the path of any one of five different stop screws 85 that are threaded into ears 86 integral with or otherwise suitably fixed to the casting or rocker 74. These five screws may be adjusted so that the pressers or rolls may be moved into close but not interfering relation with the surfaces of the chuck segments whatever may be the chuck's adjustment to suit the particular sized tire being mounted on a bull ring.

The pair of bell cranks 72 that rotatably support the pressers 71 each have their short and substantially horizontal arms 72' separately linked as indicated at 87 to pins 88 that are carried by the lever arms 89 fixed to shaft 91 having a bearing in rocker casting 74. To the shaft 91 is keyed a double hand lever 90. By movement of this double-hand lever 90 the pressers may be simultaneously advanced against the beads of a tire and as the chuck rotates effect progressive shifting of the same onto the sealing ring.

For convenience it is preferable to detail two men with this apparatus, one to manipulate the chuck and pressing mechanism, and the other to initially mount the sealing ring and tire on the chuck, the latter being contracted for facilitating this operation. So that one man will not interfere with another, and also as an aid, a preparatory assembling stand, indicated generally by the numeral 92, is mounted to the rear and slightly to one side of the front of the chuck as shown in Figs. 1 and 2. This stand comprises a base 93, a pintle 94 threaded axially therein, and adapted to be secured in any adjusted position by a split clamping nut or collar 95. Secured to the upper end of the pintle is an arm 96 which carries at its free end a saddle 97 of semi-circular form. This saddle is provided with a U-shaped slot 98 for the passage of a valve stem as is also one of the chuck segments. The saddle is preferably of a size to receive the smallest sealing ring and separate auxiliary saddles 97' of the right size may be provided to nest upon the smallest fixed one to handle sealing rings of different sizes. The arm is provided with a depending lug 99 which is adapted to contact with either of two lugs 100—101 on a collar 102 adjustably secured to the base 93 of the assembling stand. The collar 102 is preferably positioned so that the saddle may be swung from a position substantially flush with the front of the chuck to a position 90° therefrom and out of the way where one operator may conveniently assemble a carcass loosely about a sealing ring or remove one that has been mounted on a sealing ring.

Operation: In use, an operative lifts a sealing ring onto the saddle of the preparatory assembling stand, and positions a tire about it by suitably spreading its beads and canting it. If an air bag is used, it is placed upon the sealing ring before a tire is encircled thereabout. This operative then swings the saddle through an angle of about 90° and shifts the tire and sealing ring onto the chuck, taking care to position the sealing ring within the channel and the tire beads upon the inmost surfaces of the chuck sections which define its smallest girth or diameter. As the chuck has been contracted to facilitate removal of the previously mounted tire, these operations may be accomplished with little or no difficulty. The first operative then swings the saddle to an unobstructed position and proceeds to assemble another sealing ring and tire.

The second operative through the hand wheel of the chuck then expands it so as to distend the beads to approximately the diameter of the seats on the sealing ring. After depressing the foot treadle 9 to start the rotation of the chuck, the operator then advances the pressers 71 to a position in line with the tire beads by grasping the double-hand lever 90 and swinging them about the fulcrum shaft 75. By moving the lever 90 to the right, as viewed in Fig. 1, the pressers 71 may then be brought into engagement with the beads to shift the same transversely of the surface of the chuck sections, and, if the same be inclined either throughout their extent or only partly, simultaneously expanding the beads. After the tire is mounted on the sealing ring, the pressers are separated and then swung back out of the way. The chuck is then contracted and the mounted tire removed.

The foregoing relates to a preferred and modified form of construction, but it will be understood that many changes may be made therein without departing from the broad underlying principles. The chuck, for instance, may obviously be made with a fewer number of sections or jaws and separate expanding rings, i. e., instead of making the bead expanding surfaces integral with the jaws of the chuck, they may take the form of rings that are separate and distinct from the chuck jaws. The channel for the sealing ring is preferable as it centers the ring on the chuck, but the channel might be omitted. And some of the merits of the broad invention might be realized by a hand operable roller or rollers operatively supported for rotation about a sealing ring and juxtaposed wedge rings separate or integral with some form of a common support therefor. These and other changes might be made in the details of construction, and reference should therefore be made to the appended claims for an understanding of the scope of the invention.

Having thus described my invention, what I claim and desire to protect by Letters Patent is:

1. Apparatus for mounting tires on sealing rings having in combination, ring holding means, a pressing device, and means for relatively moving said holding means and pressing device in two directions at a substantial angle to each other whereby the beads of a tire may be shifted from one side of to a position upon said ring and throughout its circumference.

2. Apparatus for mounting tires on sealing rings having in combination, ring holding means, pressing means shiftable transversely of the ring holding means, and means for rotating one of said first mentioned means relative to the other.

3. Apparatus for mounting tires on sealing rings having in combination, ring holding means, a presser, means for moving the presser transversely of the ring holding means, and means for rotating the ring holding means.

4. Apparatus for mounting tires on sealing rings having in combination, a ring holder, a tire bead expanding device, and a bead pressing device, said devices being so movable relative to one another as to permit shifting the bead or beads of a tire relative to the expanding device and onto the ring.

5. Apparatus for mounting tires on sealing rings having in combination, a ring holder, tire bead expanding mechanism, and bead pressers operable upon opposite sides of a tire, said expanding mechanism and bead pressers being movable relative to one another for the purpose of shifting the beads of a tire relative to the expanding mechanism and onto the ring.

6. Apparatus for mounting tires on sealing rings having in combination, ring holding means, pressing devices, and means for relatively moving said holding means and pressing devices in two directions at a substantial angle to each other whereby the beads of a tire may be shifted from one side of to a position upon said ring and throughout its circumference.

7. Apparatus for mounting tires on sealing rings having in combination, a chuck, pressers shiftable transversely of the chuck, and means for producing a relative rotary movement between the chuck and the pressers whereby the beads of a tire may be shifted onto a ring supported by said chuck.

8. Apparatus for mounting tires on sealing rings having in combination, means for sustaining a ring, means for expanding the beads of a tire to approximately the diameter of a seat provided on the ring, and means for forcing the beads of a tire onto the ring.

9. Apparatus for mounting tires on sealing rings having in combination, means for sustaining a ring, means for expanding the beads of a tire located on opposite sides of the ring to nearly the diameter of seats thereon, means for forcing the beads toward each other and onto the sealing ring, and means cooperating with the last mentioned means to further expand the tire beads to a diameter at least as great as the seats provided in the sealing ring.

10. Apparatus for mounting tires on sealing rings having in combination, a chuck having more or less radially movable sections with surfaces for sustaining the beads of a tire, means for holding a ring in substantially flush relation with and adjacent the surfaces of the several chuck sections, and means for shifting tire beads from the chuck sections to seat them circumferentially on the ring.

11. Apparatus for mounting tires on sealing rings having in combination, spaced series of sections with surfaces movable to distend tire beads, means intermediate the series of sections for maintaining a ring substantially flush with their surfaces, and means for pressing a bead or beads of a tire onto the ring.

12. Apparatus for mounting tires on sealing rings having in combination, a chuck having spaced series of sections, means interconnecting sections of one series with those of the other for unisonal adjustment in more or less radial directions, means for adjusting the sections of one series and therethrough the sections of the other series, intermediate the series of sections for holding a ring substantially flush with their contiguous peripheries, and means for pressing one or both beads of a tire onto the ring.

13. Apparatus for mounting tires on sealing rings having in combination, a chuck having spaced series of sections shiftable to distend tire beads, means intermediate the series of sections for holding a ring substantially flush with the surfaces of the sections, means for adjusting the last named means laterally to accommodate different widths of rings, and means for shifting tire beads from the sections of the chuck onto the ring.

14. Apparatus for mounting tires on sealing rings having in combination, a chuck having a plurality of sections having bead supporting surfaces shiftable to distend tire beads, and means including a scroll cam for shifting said sections, means central of the sections for sustaining a ring flush with their bead supporting surfaces, and bead pressing mechanism.

15. Apparatus for mounting tires on sealing rings having in combination, a chuck having a spaced series of sections provided with bead supporting surfaces and a ring channel, means for adjusting the sections to vary the periphery of the chuck and the width of the ring channel, and bead pressing mechanism.

16. Apparatus for mounting tires on sealing rings having in combination, a chuck having a plurality of sections with bead supporting surfaces and provided with a centrally located ring receiving channel, means for adjusting said sections to vary the diameter of the chuck including a hand wheel rotatable independently of the chuck sections, and connections intermediate the hand wheel and the chuck sections for shifting the latter by the former.

17. A chuck for mounting tires on sealing rings having in combination, a plurality of sections shiftable to vary the diameter of the chuck, said sections being provided with bead supporting surfaces at opposite sides of the chuck and intermediate said surfaces with a channel adapted to receive a ring and sustain it substantially flush with the bead supporting surfaces when shifted.

18. A chuck for expanding tire beads preliminary to their seating on a sealing ring having in combination, a plurality of sections, said sections having bead supporting surfaces at opposite sides of the chuck, and being shaped intermediately to receive a sealing ring, means for shifting the sections to stretch the tire beads to approximately the diameter of the ring, and means for adjusting the sections relative to one another to receive rings of different widths.

19. A chuck for expanding tire beads preliminary to their seating on a sealing ring having in combination, a plurality of sections, said sections having bead supporting surfaces at opposite sides of the chuck and being shaped intermediately to receive a sealing ring and support it substantially flush with the bead supporting surfaces of the sections, means for moving the sections to stretch the tire beads, and means for adjusting the sections to receive rings of different widths, said last named means including a right and left hand threaded member for approaching or separating the bead supporting surfaces of the sections.

20. Apparatus for mounting tires on sealing rings having in combination, a ring holder, tire bead expanding means including members shiftable to position their surfaces substantially flush with and contiguous a ring in said holder, and means for shifting tire beads from the members onto the ring.

21. Apparatus for mounting tires on sealing rings having in combination, a ring holder, tire bead expanding means including members adapted to be moved to positions adjacent and flush with a ring in said holder, means for rotating the expanding means, a presser adjacent the members and movable transversely of the surfaces thereof, and means for moving said presser including power multiplying connections.

22. Apparatus for mounting tires on sealing rings having in combination, a ring holder, tire bead expanding means including members substantially flush with a ring in said holder, a presser adjacent the members and movable transversely thereof, and means for adjusting the position of the presser relative to the expanding means for insuring cooperation therewith at various expanded positions of the members.

23. Apparatus for mounting tires on sealing rings having in combination, a ring holder, tire bead expanding devices adjacent and flush with a ring in said holder, means for rotating the expanding devices, a presser adjacent the devices and movable transversely thereof, and means for moving said presser including a bell crank lever supporting the presser, a manually operable lever, and a link connecting said levers.

24. Apparatus for mounting tires on sealing rings having in combination, a ring holder, tire bead expanding devices adjacent and flush with a ring in said holder, means for rotating said devices, a presser, and means supporting said presser permitting it to be moved in planes at a substantial angle to each other whereby after a bead is shifted onto the ring the presser may be moved away from the expanding devices to a position facilitating removal of a tire mounted on the ring.

25. Apparatus for mounting tires on sealing rings having in combination, a ring holder, tire bead expanding devices adjacent and flush with a ring in said holder, means for rotating said devices, pressers, and manually operable supporting mechanism for said pressers including levers with pivots at substantial right angles.

26. Apparatus for mounting tires on sealing rings having in combination, a ring holder, tire bead expanding devices adjacent and flush with a ring in said holder, means for rotating said devices, pressers, and an operating support for said pressers permitting movement thereof transversely of the expanding devices, and also permitting movement thereof to a position not obstructing removal of a tire whose beads have been mounted on the ring.

27. Apparatus for mounting tires on sealing rings including in combination, a rotatable ring supporting chuck having a plurality of shiftable arms, members with upwardly, inwardly and convergent inclined surfaces sustained peripherentially by said arms, and means shiftable across the surfaces of the members and in proximity thereto for shifting tire beads therefrom onto a ring supported by the chuck.

28. Apparatus for mounting tires on sealing rings including in combination, a rotatable ring supporting chuck having a plurality of shiftable arms, members with upwardly, inwardly and convergent inclined surfaces fixed to the outer ends of said arms, means shiftable across the surfaces of the members and in proximity thereto for shifting tire beads therefrom onto a ring supported by the chuck.

29. Apparatus for mounting tires on sealing rings including in combination, a rotatable ring supporting chuck having a plurality of shiftable arms, members with upwardly, inwardly and convergent inclined surfaces sustained peripherentially by said arms, means shiftable across the surfaces of the members and in proximity thereto for shifting tire beads therefrom onto a ring supported by the chuck, said inclined surfaces of the members being adapted to initially receive the tire without stretching its beads.

30. Apparatus for mounting tires on sealing rings including in combination, a rotatable ring supporting chuck having a plurality of shiftable arms, members with upwardly, inwardly and convergent inclined surfaces fixed to the outer ends of said arms, means shiftable across the surfaces of the members and in proximity thereto for shifting tire beads therefrom onto a ring supported by the chuck, said members being adapted to be shifted inwardly to initially receive the tire with its beads at their normal built-up girth.

31. Apparatus for mounting tires on sealing rings including in combination, a chuck having sections shiftable to vary its periphery, means for rotating the chuck, bead pressing devices movable transversely of the plane in which the chuck is rotatable, a preparatory assembling stand having a saddle, and means movably supporting said saddle permitting movement thereof from an unobstructing position at one side of the chuck to a position contiguous the chuck whereby the mounting and demounting of the work on the chuck may be facilitated.

32. Apparatus for mounting tires on sealing rings including in combination, a chuck having sections shiftable to vary its periphery, means for rotating the chuck, bead pressing devices movable transversely of the plane in which the chuck is rotatable, a preparatory assembling stand having a saddle, and an arm supporting said saddle swiveled for movement about a substantially vertical axis located at one side and substantially abreast of the front of the chuck whereby a sealing ring and tire may be loosely assembled by one operative while another operative is seating the beads of a previously assembled tire and sealing ring.

33. An apparatus for mounting tires on sealing rings including in combination, a rotatable ring holding chuck having sections disposed equi-distant from its axis, means on the chuck for locating a sealing ring in concentric relation with the chuck, tire bead expanding devices sustained by the chuck, and bead shifting mechanism including a plurality of rollers for engaging the beads of a tire and shifting the same onto the sealing ring.

34. In an apparatus for mounting tires on sealing rings, an expansible chuck adapted to support sealing rings of different diameters, means sustained by the chuck for expanding the beads of a tire, bead shifting mechanism including rollers adjustable radially of the chuck to adapt them to operate upon different sized tires, and means for producing relative rotation of the chuck and the bead shifting mechanism whereby to effect a circumferential seating of tire beads on a sealing ring.

Signed at Hartford, county of Hartford, State of Connecticut, this 3rd day of January, 1921.

HECTOR V. LOUGH.